United States Patent [19]
Ross

[11] Patent Number: 5,554,692
[45] Date of Patent: Sep. 10, 1996

[54] BLOCKED ISOCYANATE CROSSLINKERS BASED ON PENTAERYTHRITOL FOR USE IN THERMOSETTING COATINGS

[75] Inventor: Alistair J. Ross, Strongsville, Ohio

[73] Assignee: Ferro Corporation, Cleveland, Ohio

[21] Appl. No.: 177,890

[22] Filed: Jan. 6, 1994

[51] Int. Cl.[6] ................................. C08F 8/30
[52] U.S. Cl. ................. 525/124; 525/440; 525/457; 525/528; 528/45; 528/53; 528/60; 528/73; 528/75; 528/80; 528/83; 528/84; 528/85
[58] Field of Search .................. 528/45, 53, 75, 528/80, 84, 85, 73, 83, 60; 525/124, 457, 528, 440

[56] References Cited

U.S. PATENT DOCUMENTS

| | | |
|---|---|---|
| 3,822,240 | 7/1974 | Schmitt et al. |
| 3,931,117 | 1/1976 | Leonard. |
| 4,302,351 | 11/1981 | Gras et al. ........................ 252/182 |
| 4,354,014 | 10/1982 | Wolf et al. ........................ 528/45 |
| 4,522,923 | 2/1981 | König et al. ..................... 525/452 |

FOREIGN PATENT DOCUMENTS 2613649  10/1976  Germany.

*Primary Examiner*—James J. Seidleck
*Assistant Examiner*—John M. Cooney Jr.
*Attorney, Agent, or Firm*—Rankin, Hill, Lewis & Clark

[57] ABSTRACT

The present invention concerns blocked isocyanate crosslinkers based on pentaerythritol for use in thermosetting coatings. More particularly, the invention pertains to thermosetting protective coatings containing a coreactive binder polymer comprising a hydroxyl functional matrix polymer adapted to coreact with a blocked isocyanate comprising pentaerythritol reacted with excess equivalents of isocyanate where excess isocyanate groups are blocked with a blocking agent. Pentaerythritol comprises between about 20% and 100% by weight of the polyol reactants reacted with excess isocyanate groups while the blocked crosslinker comprises between about 10% and 50% by weight of the thermosetting binder components. The preferred thermosetting coating is powder coating.

13 Claims, 1 Drawing Sheet

5,554,692

BLOCKED ISOCYANATE CROSSLINKERS BASED ON PENTAERYTHRITOL FOR USE IN THERMOSETTING COATINGS

This invention pertains to paint coatings generally and particularly to clear and pigmented powder coatings based on a thermosetting polymeric binder comprising a hydroxyl functional polymer adapted to be coreactive with a blocked isocyanate pentaerythritol crosslinker.

BACKGROUND OF THE INVENTION

This invention pertains generally to protective surface coatings commonly known as ;paint coatings which are organic compositions applied to substrates to form continuous films and are cured or otherwise hardened to provide protection as well as a decorative appearance to the substrates. Protective surface coatings ordinarily comprise an organic polymeric binder, pigments, inert fillers and other paint coating additives. The polymeric binder functions as an organic vehicle for the pigments, inerts, and other additives and further functions as a binder for the pigments and inert fillers in the cured or hardened paint film. Polymeric binders can be thermosetting binders based on coreactive binder components.

Powder coatings are organic coatings in dry powder form comprising essentially 100% nonvolatile solids based on a polymeric film forming binder. Powder coatings can be clear coatings without opacifying pigments or pigmented coatings containing opacifying pigments. Powder paints are finely pulverized polymeric compositions in the form of a dry free-flowing fine powder which melts and flows on a substrate at elevated temperatures to produce a smooth coated substrate surface. Protective surface coatings based on powder paints are particularly useful in view of environmental constraints in that powder paints ordinarily do not contain organic solvents or emit organic compounds upon baking or heat curing.

Thermosetting powder coatings ordinarily are heat thermosetting coatings and can be based on blocked isocyanate crosslinkers such as disclosed in U.S. Pat. No. 3,822,240 and U.S. Pat. No. 3,931,117. In this regard, solid blocked isocyanates are commonly the reaction product of a polyol such as ethylene glycol or trimethylol propane with an isocyanate and a blocking agent such as caprolactam or MEK oxime. The function of the polyol and the amount used is to raise the softening point of the crosslinker whereby the physical blend will be stable and the resultant powder coatings will not sinter or fuse into lumps at room temperature or at storage temperatures up to 45° C.

Since isocyanates are expensive, the lowest cost blocked isocyanate would be a simple blocked isocyanate such as caprolactam blocked IPDI, but this is not used despite the low equivalent weight because the softening point is too low and the crosslinker would only be difunctional. The softening point of the crosslinker cannot readily be compensated for by raising the Tg of the resin, especially if the polymer is a polyester, without having to raise the molecular weight and/or use expensive raw materials, or both. If the functionality of the polyester is increased to compensate for the lower functionality of a difunctional crosslinker, the hydroxyl number will be increased for a given molecular weight thus increasing the amount of crosslinker required. Another approach to making blocked isocyanates with a better tack temperature at lower equivalent weight is by trimerization of part of the isocyanate, which is described in the following patents: U.S. Pat. Nos. 4,252,923; 4,302,351; and 4,354,014. These processes/compositions are based on blocked isocyanate trimers which are inherently more expensive than the compositions of this invention.

It now has been found that substantially improved thermosetting powder paints can be produced by crosslinking hydroxyl functional polymers upon heating with a blocked isocyanate comprising a pentaerythritol isocyanate having unreacted isocyanates blocked with a blocking agent such as e-caprolactam. Use of pentaerythritol as the major polyol component by reacting with excess equivalents of isocyanate and producing a blocked isocyanate crosslinker provides substantially improved powder coatings exhibiting higher tack temperatures at a given equivalent weight as well as lower melt viscosities. It has been found that major amounts of pentaerythritol can be used in conjunction with lesser amounts of aliphatic diols Such as 1,4-butane diol, 1,6-hexane diol to yield blocked isocyanate to give improved impact with acrylic polymers.

Although U.S. Pat. Nos. 3,822,240 and 3,931,117 describe the manufacture of blocked isocyanates and uses in crosslinking hydroxyl functional polyesters and acrylic resins in powder coatings, pentaerythritol is not mentioned as a polyol to make the blocked isocyanate.

Advantages of the present invention include lower raw material costs due to ability to produce the higher tack temperatures at lower equivalent weight as well as the ability to use most any type of isocyanates which do not trimerize such as Desmodur W (dicyclohexylmethane 4,4'diisocyanate); m-TMXDI benzene, 1,3 bis(isocyanate, 1 methyl-ethyl). The preferred method of synthesis is to charge the molten caprolactam, add the pentaerythritol at about 130° C., and dissolve the pentaerythritol in the caprolactam. The isocyanate is then added and the exotherm allowed to raise the batch temperature to about 140° C. and the temperature controlled by the rate of addition of the isocyanate.

The process of this invention is contrasted with the use of liquid or lower melting polyols conventionally used where a narrow molecular weight distribution is achieved by melting the polyol and add to the pre-reacted mixture of caprolactam and isocyanate. Accordingly, this invention provides an improved solid blocked isocyanate crosslinker for powder coatings using pentaerythritol as the branching agent for the isocyanate blocked crosslinking agent. By using pentaerythritol rather than the more commonly used polyols, solid blocked isocyanate crosslinkers can be made which are better suited for use as crosslinkers in powder coatings due to higher tack temperature at a given equivalent weight and lower melt viscosities. These and other advantages will become more apparent by referring to the detailed description and illustrative examples.

SUMMARY OF THE INVENTION

Briefly, the invention pertains to thermosetting protective coatings containing a coreactive binder polymer comprising a hydroxyl functional matrix polymer adapted to coreact with a blocked isocyanate comprising pentaerythritol reacted with excess equivalents of isocyanate where excess isocyanate groups are blocked with a blocking agent. Pentaerythritol comprises between about 20% and 100% by weight of the polyol reactants reacted with excess isocyanate groups while the blocked crosslinker comprises between about 10% and 50% by weight of the thermosetting binder components. The preferred coating is powder coating.

DRAWINGS

In the attached drawing FIG. 1 represents one of the reaction products of the present invention.

DETAILED DESCRIPTION OF THE INVENTION

Figure 1:
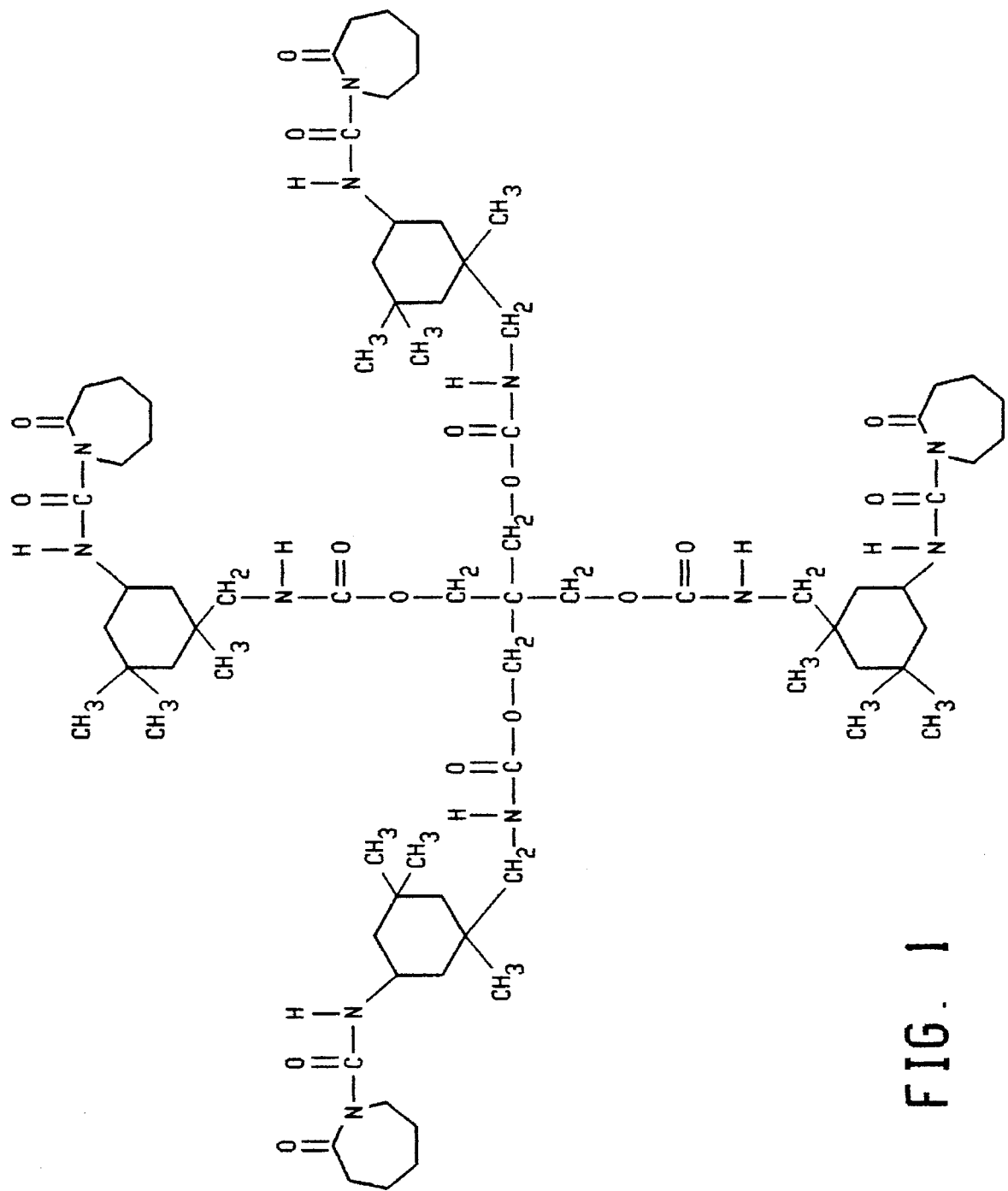

The powder paint of this invention comprises a thermosetting polymeric binder containing a blocked isocyanate crosslinker adapted to crosslink with a hydroxyl functional matrix polymer.

Referring first to the blocked isocyanate crosslinker, isocyanates are coreacted with lesser equivalents of pentaerythritol where excess isocyanate groups are blocked with heat activated blocking agents adapted to unblock upon heating. Preferred blocked isocyanates become unblocked and activated under heat and at temperatures approximately above the melt temperature of the powder paint. Latent blocked isocyanate crosslinking agents useful in this invention are derived from a wide variety of isocyanates and/or mixtures thereof and include, for example, Desmodur W (dicyclohexylmethane 4,4'diisocyanate); m-TMXDI benzene, 1,3 bis(isocyanate, 1 methyl-ethyl); isophorone diisocyanate; 2,4-tolylene diisocyanate; 2,6-tolylene diisocyanate; alkylene diisocyanates such as 1,4-tetramethylene-diisocyanate; 1,6-hexamethylene diisocyanate; 1,12-dodecane diisocyanate; cyclobutane and cyclohexane (1,3 and 1,4-) diisocyanates; phenylene diisocyanates (1,3- and 1,4-) and naphthalene-1,5-diisocyanate. Suitable blocking agents are those known in the art and include alcohols, phenol, ketoximes and the like. Especially preferred blocking agents are caprolactam, MEK oxime and acetone oxime. Oxime preferred crosslinking agents comprise isophorone diisocyanate adduct of pentaerythritol blocked with caprolactam.

In accordance with this invention, pentaerythritol is reacted with isocyanate on an equivalent basis with 0.2 to 0.3 equivalents of pentaerythritol per equivalent of isocyanate where diisocyanates are preferred although monoisocyanates can be used just as well since branching occurs through the pentaerythritol. FIG. 1 shows the reaction product of pentaerythritol with diisocyanate and caprolactam. Examples of useful monoisocyanates include octadecyl or cyclohexyl. Pentaerythritol can be combined with minor amounts of conventional glycols (diols) or triols if desired to react with the isocyanate where the total equivalents of pentaerythritol plus glycol is less than the isocyanate reactants to provide a precursor containing excess isocyanate groups for blocking purposes. Useful glycols include for instance, ethylene glycol, propylene glycol, 1,4 butane diol, butylene glycols, diethylene glycol, dipropylene glycol, 1,6 hexane diol, hydrogenated bisphenol A, neopentyl glycol or similar lower molecular weight glycols. On a weight basis, the pentaerythritol and glycol mixture reacted with excess equivalents of isocyanate comprises between 20% and 99.5% pentaerythritol where the preferred range is between 50% and 99.5% pentaerythritol. On an equivalent basis, the pentaerythritol and glycol mixture is reacted with between about 2.5 and 4.0 excess equivalents of isocyanate.

In the manufacture of blocked isocyanates using diols or triols the usual procedure is to pre-react the isocyanate with the blocking agent then add the polyol slowly, at a suitable temperature generally around 150° C. with cooling. If the polyol is solid, it can be added by pre-melting. In this manner the polydispersity is kept relatively low.

However, due to the extremely high melting point of pentaerythritol, it must be added as a solid. It was found that if commercial pure pentaerythritol was added in the above manner, complete reaction could not readily be achieved due to this high melting point, the rather coarse particle size, and the low solubility of the pentaerythritol in the partially blocked isocyanate.

It was found that this difficulty could be overcome by using finely ground pentaerythritol which facilitated reaction and avoided the formation of seeds of crosslinked or unreacted material, and enabled the synthesis to proceed readily.

Alternatively, and surprisingly, it was found that material with an equally narrow Mw distribution could be made using commercially pure pentaerythritol by adding the pentaerythritol to the caprolactam (or vice versa) and holding at 130° C. for a short time (about 5–10 minutes), the pentaerythritol readily and rapidly dissolved in the caprolactam.

The isocyanate was then added (with cooling if necessary) maintaining a temperature of around 150° C. The temperature can also be controlled by monitoring the addition rate of the isocyanate. The resultant product was essentially identical to the produced by the use of ground pentaerythritol, in solution viscosity, tack temperature, and polydispersity as measured by GPC/Mw.

If a crosslinker of higher Mw and polydispersity is desired, this can readily be achieved at the same equivalent weight by predissolving the pentaerythritol in part of the caprolactam, adding the isocyanate as described above, then adding the remaining caprolactam.

While commercially pure pentaerythritol is preferred where low polydispersity is necessary, this process is amenable to the use of technical pentaerythritol. Technical grade pentaerythritol differs from the pure grade in that it contains around 12% of dipentaerythritol the hexafunctional ether formed from 2 mols of pentaerythritol, and around 1% of tripentaerythritol.

Technical pentaerythritol can be used in place of the pure grade in the processes and in the rations normally used in this invention. The effect being to broaden the molecular weight distribution at the same equivalent weight. Adjustment is made to the composition to allow for the slightly lower hydroxyl number of the dipentaerythritol content. Due to the higher functionality of the technical grade this means that the amount of technical grade which can be used is more limited before high viscosity or gelation of the crosslinker will result.

If the crosslinker is to be used in non-powder coating applications, e.g., liquid coatings, it can readily be dissolved in suitable solvents on completion of the reaction.

In all cases, the completion of the reaction can readily be determined by measuring the viscosity in a suitable solvent, i.e., toluene, xylene, MEK, etc. and by measuring the free isocyanate by titration using standard analytical methods.

The reaction can be catalyzed by typical urethane catalysis, stannous octoate, dibutyl tin dilaurate etc. but this is generally not necessary.

Referring now to the hydroxyl functional matrix polymers for coreaction with the blocked isocyanate crosslinker, particularly suitable hydroxyl polymers for powder paints comprise a wide range depending upon the intended application of the powder coating.

For high flexibility coatings linear or lightly branched polyesters made from linear or cycloaliphatic glycols typically neopentyl glycol, diethylene glycol, dipropylene glycol, ethylene glycol, 1,6-hexane diol, or cyclohexane dimethanol.

These are reacted with aromatic diacids especially terephthalic acid, with minor amounts of aromatic or aliphatic acids for example, isophthalic acid, cyclohexane dicarboxylic acid, adipic acid, azelaic acid, dodecanedioic acid. A small excess of polyol(s) to acid(s) is used generally 1:1 or 1:2 equivalents of polyols to acids.

These high flexibility coatings are generally lightly branched with either a triol like trimethylol propane or alternatively trimellitic anhydride.

Typical polyesters of this type having a hydroxyl number of from 35 to around 120 and acid numbers of less than 14.

When harder, more chemical resistant coatings are desired polyester suitable for this invention can be made using mainly polyols which are tri-functional like trimethylol propane or trimethylol ethane. These triols are reacted with aromatic acids like isophthalic or terephthalic acid to yield polyesters with hydroxyl numbers of around 300 at acid numbers of 2–5. The hydroxyl to carboxyl ratio is around 1:8 to 1.

The polyester can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound. In this aspect of the invention, the coating binder can contain on a weight basis between 50% and 90% hydroxyl functional polyester polymer and between 10% and 50% blocked isocyanate crosslinker. Another type of powder coating which utilizes this type of urethane crosslinker is the so-called tricomponent system where the primary crosslinking mechanism is that between solid acid functional polyesters prepared from polyols and acids described above where the diacid is in slight excess over the polyol. This yields a polyester resin typically with an acid number of 30 to 75.

This acid functional polyester is crosslinked by 30–70% by weight of a solid bisphenol A epoxy resin, the cure is supplemented by the use of minor (up to 250) typically 10% of blocked isocyanate. This increases the crosslink density and thus the chemical and stain resistance of the coatings. The hydroxyl groups are those originally on the backbone of the epoxy resin and those generated by the reaction of the epoxy resin with the carboxyl group of the polyester.

In another aspect of this invention, the thermosetting polymeric binder composition can further contain a functionally reactive acrylic polymer containing hydroxyl groups adapted to be coreactive with the blocked isocyanate crosslinker. Useful acrylic copolymers are produced by solvent or fusion polymerization of ethylenically unsaturated monomers containing carbon-to-carbon double bond unsaturation including acrylic monomers and hydroxyl functional monomers as well as other ethylenic monomers such as vinyl monomers, allylic monomers and acrylamide monomers. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohex as well as conjugated dienes such as 1,3 butadiene, methyl1-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl ester of acrylic or methacrylic acid having an alkyl ester portion containing between 1 to 12 carbon atoms as well as aromatic derivatives of acrylic and methacrylic acid. Useful acrylic monomers include for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers react with acrylic and methacrylic acids, hydroxyl alkyl acrylates and methacrylates such as hydroxyethyl and hydroxypropyl acrylates and methacrylates, as well as amino acrylates and methacrylates, and acrylic and methacrylic acid. Hydroxyl functional monomers include hydroxy alkyl acrylates such as 2-hydroxy ethyl acrylate and methacrylate, 2-hydroxy propyl acrylate and methacrylate, and similar hydroxy lower alkyl acrylates or methacrylates. On a weight basis, the hydroxyl functional acrylate copolymer comprises copolymerized monomers between 45% and 75% acrylic monomers, between 5% and 35% hydroxyl functional monomers, with the balance being other ethylenically unsaturated monomers.

The hydroxyl functional acrylic polymer can be produced by bulk polymerization of ethylenically unsaturated monomers activated by peroxide or azo or other free radical initiator at polymerization temperatures typically between 70° C. to 170° C. and preferably between 120° C. to 150° C. Typically 0.5 to 3% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such azo bisisobutyronitrile and dimethylazobisisobutyrates; as well as alkali metal persulfate or ammonium persulfates. Mercaptans can be added at levels of about 2% to 4% based on the weight of the monomers to provide copolymers of low molecular weight. Mercaptans useful in controlling molecular weight and primarily to produce low molecular weight polymers include for example 2-mercaptoethanol; 1-mercapto-2-propanol; and 2-hydroxyethyl-3-mercapto propionate. The number molecular weight of the acrylic copolymer can be between 3,000 and 10,000 as measured by GPC according to ASTM D 3016-72; D3536-76; and D3593-80. The Tg or softening point of the acrylic polymer should be at least 60° C. as calculated by the Fox equation based on the ratio of specific monomers. The hydroxyl number of the acrylic copolymer is between 30 and 150 as measured by mg KOH/g. In this aspect of the invention, the coating binder can contain between 90% and 65% hydroxyl functional acrylic polymer and between 10% and 35% blocked isocyanate crosslinker on a weight basis.

Hydroxyl functional polyurethane polymers can be crosslinked in accordance with this invention. Hydroxyl functional polyurethane polymers typically contain urethane groups in the polymer backbone and are produced by reacting excess equivalents of diol or polyol with lesser equivalents of di- or polyisocyanate. The polyisocyanates can be di- or triisocyanates such as for example 2,4 and 2,6 tolylene diisocyanate, phenylene diisocyanate; hexamethylene or tetramethylene diisocyanate, 1,5-naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cyclo-aliphatic and aromatic polyisocyanates such as for example, hexamethylene, 1,6-diisocyanate, isophorone diisocyanate, 1,4-dimethyl cyclohexane diisocyanate, diphenylmethane diisocyanate, 2,4-tolylene diisocyanate, 2,6-tolylene diisocyanate and mixtures thereof, polymethylene polyphenyl polyisocyanate. Useful polyols preferably contain two or more hydroxyl groups for coreaction with the isocyanate groups. Useful polyols are: diols such as ethylene glycol, propylene glycols, butylene glycols, neopentyl glycol, 1,4 -cyclohexane dimethanol, triols such as glycerol, trimethylol propane, and trimethylol ethane as well as low molecular weight polyester polyols and polyether polyols, oxides to polyols; polycaprolactone polyols produced by the addition of monomeric lactones to polyols, such as caprolactone; hydroxy terminated polyesters produced by condensation of any of the above polyols with polybasic acids in such ration that the final condensate is substantially free from carboxyl acidity and has a molecular weight range up to about 5000.

The thermosetting coatings of this invention containing hydroxyl polymer and coreactive blocked isocyanates are particularly useful as surface protective coatings applied to substrates as a continuous film for the purpose of decorative appearance as well as protection of the substrate. Powder paint is applied to the substrate as dry powder and heated to melt the powder particles into a continuous paint film, which can be fused and thermoset under heat. A powder paint coating ordinarily comprises an organic binder, pigments, and various additives. The polymeric binder, which is thermosetting, acts as a dispersant for the pigments and functions as a binder for the pigments in the cured or hardened paint film. The binder imparts rheological properties to the paint coating and provides adhesion of the paint film to the substrate. The pigments may be organic or inorganic and functionally contribute to opacity and color in addition to durability and hardness, although some powder paint coatings contain little or no opacifying pigments and are described as clear coatings. Pigments ordinarily can include opacifying pigments such as titanium dioxide, zinc oxide, leaded zinc oxide, as well as tinting pigments such as carbon black, yellow oxides, brown oxides, tan oxides, raw and burnt sienna or umber, chromium oxide green, phthalocyanine green, phthalonitrile blue, ultra-marine blue, cadmium pigments, chromium pigments, and the like. Filler pigments such as clay, silica, talc, mica, wollastonite, wood flower and the like can be added. Up to about six weight parts and typically between about 3.5 and 4 weight parts of pigment can be combined with one weight part of polymeric binder depending on the absorption properties of the pigment particles. Pigmented powder coatings typically comprise a pigment to binder ratio of about 1 to 1.

To produce powder coatings, the raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated. The exit extruder temperature is regulated according to the type of powder paint being produced by generally is between about 90° and 150° C. at the heated exit die of the screw fed extruder. The extrudate emerges from the extruder through chilled rolls as a ribbon with a thickness of about ¼ inch. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles into powder paint of less than 325 mesh and preferably passing a 200 mesh U.S. Standard sieve screen whereupon the powder can be further classified into particle size if desired.

The merits of this invention are further illustrated by the following examples wherein parts are by weight and temperatures are in °C. unless otherwise indicated.

EXAMPLE 1

A blocked isocyanate was made as follows:

To a reactor 40.4 parts by weight of pentaerythritol technically pure grade (1.14 equivalents) were charged with a nitrogen blanket. Molten caprolactam (3.67 equivalents) were then charged with stirring and the batch heated to 140° C. The pentaerythritol dissolved readily to give a clear solution in the caprolactam in about 10–15 minutes. 539 parts by weight of isophorone diisocyanate (4.85 equivalents) were then fed in over 2 hours, with light cooling/heating as needed to maintain a temperature of 140°–150° C. The batch was then held for 2 hours to complete the reaction as measured by free NCO 0.6% on a rapidly cooled sample the properties on the same were:

Free NCO 0.66%

Tack temperature 189° F.

Viscosity U+@ 65% NV in xylene

Viscosity 295 P @ 135° C. @ 100%

GPC Mw 2430 Mn 636 Mw/Mn 3.82

NCO Equivalent weight 280

Color: water white

EXAMPLE 2

A blocked isocyanate crosslinker variant was made using Desmodur W (Miles) @ 300 equivalent weight. Desmodur W is dicyclohexylmethane 4,4' diisocyanate. This crosslinker was made at a slightly higher equivalent weight to compensate for the higher molecular weight of Desmodur W vs. IPDI 262 vs. 222. The process used was as in Example 1. Specifically, in a reactor, 38.3 parts of pentaerythritol (1.13 equivalents) were added to 377.3 parts molten caprolactam (3.33 equivalents) and fully dissolved at 140° C., and then 584.3 parts Desmodur W (4.46 equivalents) was added over 1 hour. The batch exothermed to 160° C. and was held for 3 hours to complete the reaction. A sample was removed and measured for free NCO at 1.36%. There was no unreacted pentaerythritol. The batch was cooled to 140° C. and poured onto trays. The properties of the crosslinker were:

Free NCO 0.56

Viscosity X-Y 65% NV in xylene

Tack Temperature 179° F.

Viscosity @ 135° C. 225 poise

NCO Equivalent weight 300

GPC Mw 2950 Mn 666 Mw/Mn 4.44

EXAMPLE 3

(Comparative Example)

This is a blocked isocyanate using IPDI and trimethylol propane as the branching agent, blocked with caprolactam. Molten caprolactam 378.7 parts (3.35 equivalents) were charged to a reactor. IPDI 537.3 parts (4.48 equivalents) were added over several hours, and allowed to exotherm to 160° C. The batch was cooled to 95° C. and molten TMP 84 parts (1.88 equivalents) were added at such a rate that the batch exothermed and was held at 160° C. The batch was then held at 160° C. until the free NCO on a rapidly cooled sample was <0.6% NV in cellosolve acetate. The properties of this crosslinker were:

Free NCO<0.6%

Tack temperature 182°–188° F.

Viscosity T-½–W-½ @ 60% NV in cellosolve acetate

NCO Equivalent weight 338

GPC Mw=1920 Mn 682 Mw/Mn=2.80

EXAMPLE 4

This crosslinker is designed to have a similar viscosity, tack temperature, but lower functionality than an all pentaerythritol crosslinker of the same equivalent weight.

In a reaction 415.25 parts of molten caprolactam were charged and blanketed with dry nitrogen (3.67 equivalents). 28.4 parts of commercial pure pentaerythritol (0.84 equivalents, 0.21 mols) and 18.0 parts of trimethylol ethane (0.44 equivalents, 0.15 mols) were added and the batch was held at 125°–130° C. for 15 minutes at which point both polyols dissolved in the caprolactam. 488.4 parts IPDI was then added (4.4 equivalents) with heating/cooling over two hours—holding the temperature at 140° C. After two additional hours, the batch was tested for free NCO and found to exhibit 0.68% NCO on a rapidly cooled sample. The batch was flaked and had the following constants:

Free NCO 0.59

Tack Temp 183° F.

Viscosity 215 P @ 135° C.

Visc. 65% NV in Xylene V–

GPC Mw 2100 Mn 550 Mw/Mn 3.81

NCO Equivalent weight 305

EXAMPLE 5

Using tech grade pentaerythritol and the process used in Example 1, 46.3 parts of technical grade pentaerythritol (1.39 equiv.) were charged to the reactor with a dry nitrogen blanket. 415.2 parts (3.67 equivalents) of molten caprolactam were charged with stirring. At 119° C. all the pentaerythritol had dissolved, and addition of 538.5 parts (4.84 equiv.) or isophorone diisocyanate was made over two hours. The temperature was held at 150° C. during the addition, then allowed to fall to 142° C. After 4 hours, the batch was poured out. The properties of the blocked isocyanate were as follows:

Viscosity V+⅔ @ 65% NV in xylene

400 P @ 135° C.

Free NCO 0.22%

Tack temperature 190° F.

GPC Mw 3310 Mn 629 Mw/Mn 5.26

EXAMPLE 6

550 parts trimethylol propane (TMP), 4.1 mols or 12.3 equivalents are charged to a reactor fitted with a packed column, nitrogen sparge and receiver. The TMP was heated With agitation and nitrogen sparge to around 100° C and 573parts of isophthalic acid 3.45 mols (6.9 equiv.) were added while maintaining at least 66° C. upheat to approx 182° C. when distillation of water through packed column begins. Maintain a head temperature of 103°–105° C. and a maximum batch temperature of 220° C. Acid number and viscosity @ 175° C. on ICI Cone and Plate were followed. The reaction was continued until an acid number of 3–6 and a viscosity of 100–150 poise @175 was obtained. This reaction results in a high hydroxyl polyester with a theoretical OH No. of 280–300.

EXAMPLE 7

A commercial polyester comprising essentially a linear neopentyl glycol terephthalate type RUCO 106 available from Ruco Chemical Company with the following constants:

hydroxyl no. 41.2 acid no. 13.4

NCO Equivalent weight 290

ICI Viscosity 43.5 Poise @ 200° C.; was used to evaluate the Examples.

EXAMPLE 8

The high hydroxyl polyester in Example 6 was used to evaluate the crosslinker in Example 1 and the comparative Example 3. The crosslinker of Example 2 was evaluated at a resin to crosslinker ratio of 50/50 and 55/45 rate.

|  | A | B | C |
|---|---|---|---|
| Polyester Example 6 | 550 | 500 | 552 |
| Crosslinker Example 1 | 450 | — | 451 |
| Comparative Example 3 | — | 500 | — |
| Epoxy resin GT7014 (Ciba Geigy) | 55 | 55 | 55 |
| Flow modifier (acrylic) | 13 | 13 | 13 |
| Benzoin | 4 | 4 | 4 |
| Anti-Oxidant | 24 | 24 | 24 |
| Titanium Diocide RCL 9 grade | 888 | 888 | 888 |

The above was blended, wellexed, extruded, ground sieved, the key powder properties test, then the powders sprayed electrostatically onto bonderite 1000 panels and baked in a gas fired oven @ 380° F. for stated times. The film thicknesses were controlled @ 1.8–2.0 mls.

The powder properties were:

|  | A | B | C |
|---|---|---|---|
| Gel time @ 375° F. | 80 sec | 100 sec | 82 sec |
| Tack temp. °F. | 183 | 183 | 187 |
| Pellet flow 30' @ 300° F. | 80 m | 100 m | 82 m |
| Film Properties: |  |  |  |
| Gloss 20° | 58 | 67.5 | 58.5 |
| 60° | 84 | 86 | 85 |
| Impact Direct | 40 | 40 | 40 |
| Reverse | 5 | 5 | 10 |
| Pencil Hardness | 6 | 5 | 5 |

From this work it was concluded that the crosslinker in Example 1 at a 55/45 resin crosslinker ratio performed equally with the comparative Example 3 at a 50/50 resin crosslinker ratio.

EXAMPLE 9

Using the same procedure as described above, powders were prepared at a pigment/binder ratio of 0.5 with $TiO_2$ pigment using RUCO 106 polyester (Example 7) to yield high flexibility coatings.

|   | A | B | C | D |
|---|---|---|---|---|
| Resin/Crosslinker ratio | 83/17 | 80/20 | 83/17 | 83/17 |
| Crosslinker | Ex. 3 | Ex. 3 | Ex. 1 | Ex. 4 |
| Powder properties | 253 | 246 | 191 | 257 |
| Tack Temp. | 184 | 185 | 182 | 181 |
| Impact (direct/reverse) | 40/60 | 160/120 | 160/160 | 140/160 |
| Gloss 20/60 | 810/931 | 818/927 | 838/931 | 849/933 |
| Pencil Hardness | H | H | H | H |
| MEK Resistance | 215 | 434 | 300 | 332 |

The performance of example B, C and D are substantially equal, i.e., the TMP based crosslinker has to be used at a significantly higher level to match the performance of the pentaerythritol based crosslinker.

EXAMPLE 10

This Example shows the performance of the crosslinker of Example 2 when formulated into a paint with an acrylic resin such as S. C. Johnson SCX-802.

The powder was processed as in examples above at a pigment/binder of 65/1 using R960 TiO$_2$ (exterior durable grade, DuPont). The resin/crosslinker ratio was 69/31.

The powder properties were:

| Gel time | 78 sec |
|---|---|
| Pellet flow | 72 mm |
| Tack temp | 171° F. |

Film properties measured on Bonderite 1000 Panels baked 20 mins. @0 390° F.

| Direct impact | 60 @ 0.9 mils |
|---|---|
| Gloss 20/60" | 51/81 |

Although the invention has been shown and described above with respect to specific embodiments, it is obvious that equivalent alterations and modifications will occur to others skilled in the art upon reading and understanding the specification. The present invention includes all such equivalent alterations and modifications, and is limited only by the scope of the following claims.

I claim:

1. A thermosetting coating comprising the reaction product of (A) at least one hydroxyl containing polymer and (B) a blocked isocyanate crosslinking agent comprising the reaction product of (1) (a) pentaerythritol or (b) a mixture of pentaerythritol and a diol or a triol, (2) at least one blocking agent and (3) at least one diisocyanate.

2. The thermosetting coating of claim 1 wherein the hydroxyl containing polymer is at least one hydroxyl containing polyester or a hydroxyl containing acrylic polymer, and a hydroxyl containing polyurethane.

3. The thermosetting coating of claim 2 wherein the hydroxyl containing polymer is a polyester of a glycol and an aromatic diacid.

4. The thermosetting coating of claim 1 wherein the coating contains from about 50% to about 90% by weight of the hydroxyl containing polymer and from about 10% to about 50% by weight of the blocked isocyanate crosslinking agent.

5. The thermosetting coating of claim 1 wherein the coating is a reaction product of said (A), said (B), and (C) at least one epoxy resin.

6. The thermosetting coating of claim 1 further comprising a pigment.

7. The thermosetting coating of claim 5 where the epoxy resin is a solid bisphenol epoxy resin.

8. The thermosetting coating of claim 5 wherein the epoxy resin is present in an amount from about 30% to 70% by weight and the blocked isocyanate crosslinking agent is present in an amount up to about 25% by weight.

9. A thermosetting coating comprising the reaction product of (A) at least one hydroxyl containing polymer and (B) a blocked isocyanate crosslinking agent comprising the reaction product of (1) pentaerythritol or a mixture of pentaerythritol and a glycol, (2) a lactam blocking agent and 3) a diisocyanate.

10. The thermosetting coating of claim 1 wherein the hydroxyl containing polymer is at least one hydroxyl containing polyester or a hydroxyl containing acrylic polymer, and a hydroxyl containing polyurethane.

11. The thermosetting coating of claim 1 wherein the coating is a reaction product of said (A), said (B), and (C) at least one epoxy resin.

12. The thermosetting coating of claim 9 further comprising a pigment.

13. A thermosetting powder coating composition comprising (A) at least one hydroxyl containing polymer and (B) a blocked isocyanate crosslinking agent comprising the reaction product of (1)(a) pentaerythritol or (b) a mixture of pentaerythritol and a diol or a triol, (2) at least one blocking agent and (3) at least one diisocyanate.

* * * * *